ABSTRACT
United States Patent [19]
Decker, Jr.

[11] Patent Number: 4,763,418
[45] Date of Patent: Aug. 16, 1988

[54] AUTOMATIC SEXTANT

[75] Inventor: John A. Decker, Jr., Wailuku, Hi.

[73] Assignee: Kuau Technology, Ltd., Puunene, Hi.

[21] Appl. No.: 943,607

[22] Filed: Dec. 18, 1986

Related U.S. Application Data

[63] Continuation of Ser. No. 590,473, Mar. 16, 1984, abandoned.

[51] Int. Cl.$^4$ .............................................. G01C 1/08
[52] U.S. Cl. .................................................... 33/268
[58] Field of Search ................ 33/267, 268, 269, 277; 356/140

[56] References Cited

U.S. PATENT DOCUMENTS

| | | | |
|---|---|---|---|
| 3,194,949 | 7/1965 | Jasperson | 235/151 |
| 3,360,638 | 12/1967 | Lillestrand et al. | 235/150.271 |
| 3,482,321 | 12/1969 | Inshaw | 33/1 PT X |
| 3,752,591 | 8/1973 | Feldman | 356/247 |
| 3,854,037 | 12/1974 | Feldman et al. | 235/150.27 |
| 3,912,397 | 10/1975 | Zoltan | 356/141 |
| 3,968,570 | 7/1976 | Leuchter, Jr. | 33/267 |
| 3,985,446 | 10/1976 | Feldman et al. | 356/144 |
| 4,082,462 | 4/1978 | Owen | 356/152 |
| 4,083,636 | 4/1978 | Owen | 356/141 |
| 4,197,653 | 4/1980 | Laxo | 33/268 |

FOREIGN PATENT DOCUMENTS

| | | | |
|---|---|---|---|
| 361407 | 11/1931 | United Kingdom | 33/268 |
| 556034 | 7/1942 | United Kingdom | 33/268 |
| 2062861 | 5/1981 | United Kingdom | 33/282 |
| 0779803 | 11/1980 | U.S.S.R. | |

Primary Examiner—Harry N. Haroian

[57] ABSTRACT

A sextant for indicating the angular separation between two objects, including two members interconnected at a pivot point, means for adjusting the angle between the members to be indicative of the angular separation between the objects, the means for adjusting including coarse and fine adjustment means, and a pair of encoders for converting the respective positions of the coarse and fine adjustment means to signals which are together indicative of the angular separation. In other aspects, there is a single encoder having a track on the sextant arc and a sensor on the tangent arm; and an indicator tells the user when the sextant has been set to the prestored altitudes of reference celestial bodies.

12 Claims, 4 Drawing Sheets

AUTOMATIC SEXTANT

This is a continuation of co-pending application Ser. No. 590,473, filed on Mar. 16, 1984, now abandoned.

BACKGROUND OF THE INVENTION

This invention relates to sextants and to celestial navigation systems.

In fixing a position on the earth by celestial navigation, the navigator first uses a sextant to measure the altitude angles above the horizon of at least two celestial bodies, typically stars, planets, the sun and/or the moon. The typical sextant has a frame to which a pivoting tangent arm is attached at one point. A sighting telescope and a horizon glass (on the optical axis of the telescope) are mounted on the frame and a mirror is mounted on the tangent arm at the pivot point. Using the telescope, the navigator sights the horizon through the clear half of the horizon glass, and by pivoting the tangent arm the tangent arm mirror can be caused to reflect onto the mirrored half of the horizon glass an image of a selected celestial body, e.g., a star. An arc surface of the frame is marked to show degrees with respect to a reference line on the tangent arm. When the position of the tangent arm causes the star's image to appear to be at the horizon, the angular reading on the arc tells the altitude angle of the chosen star. Micrometer adjustments of the tangent arm permit accurate readings, with a precision on the order of 1 arc min.

SUMMARY OF THE INVENTION

In general, the invention features, in one aspect, a sextant for indicating the angular separation between two objects, including two members interconnected at a pivot point, means for adjusting the angle between the members to be indicative of the angular separation between the objects, the means for adjusting including coarse and fine adjustment means, and a pair of encoders for converting the respective positions of the coarse and fine adjustment means to signals which are together indicative of the angular separation.

In preferred embodiments, the encoders are shaft angle encoders; one encoder is mounted at the pivot point; one encoder includes an optical track mounted on the arc of a frame of the sextant, and a sensor for reading the optical track mounted on a tangent arm of the sextant; the degree of resolution of each encoder is lower than the resolution which would be required to produce the same accuracy in the indication of angular separation if only a single encoder were used; the coarse encoder has an optical track having approximately 720 lines per revolution; and the fine encoder has an optical track having approximately 600 lines per revolution.

In another aspect, the invention features a sextant for indicating the angular separation between objects, having first and second members interconnected at a pivot point, the first member having an arc centered on the pivot point, and an encoder having a succession of indexing indicia on the arc, and a sensor on the second member sensitive to the indicia and responsive to motion of the second member with respect to the first member about the pivot point to generate signals indicative of the angular separation.

In another aspect, the invention features a sextant system for making altitude observations having a memory for storing reference altitude signals for a plurality of celestial bodies, means connected to the sextant for providing angle signals corresponding to the angular setting of the sextant, an indicator for alerting the user that the angular setting corresponds to the reference altitude of a selected celestial body, and circuitry for comparing the angle signals and the reference altitude signals and for triggering the indicator.

In preferred embodiments, the memory is further arranged for storing estimated current position signals and reference azimuth signals for the celestial bodies, and there is a clock for providing signals corresponding to the current time, and searching means responsive to the memory and the clock for identifying celestial bodies for observation at the estimated current position at the current time, and for retrieving the reference altitude signals and reference azimuth signals of the identified celestial bodies; and there is means for triggering a reading of the angle signal corresponding to each identified celestial body, and analysis circuitry arranged for deriving a line of position from the angle signal which is read.

The encoders are simple, inexpensive, and provide accurate altitude readings, and position fix can be obtained quickly and easily.

Other advantages and features of the invention will be apparent from the following description of the preferred embodiment and from the claims.

DESCRIPTION OF THE PREFERRED EMBODIMENT

We first briefly describe the drawings.

Drawings

STRUCTURE

Figure 1:
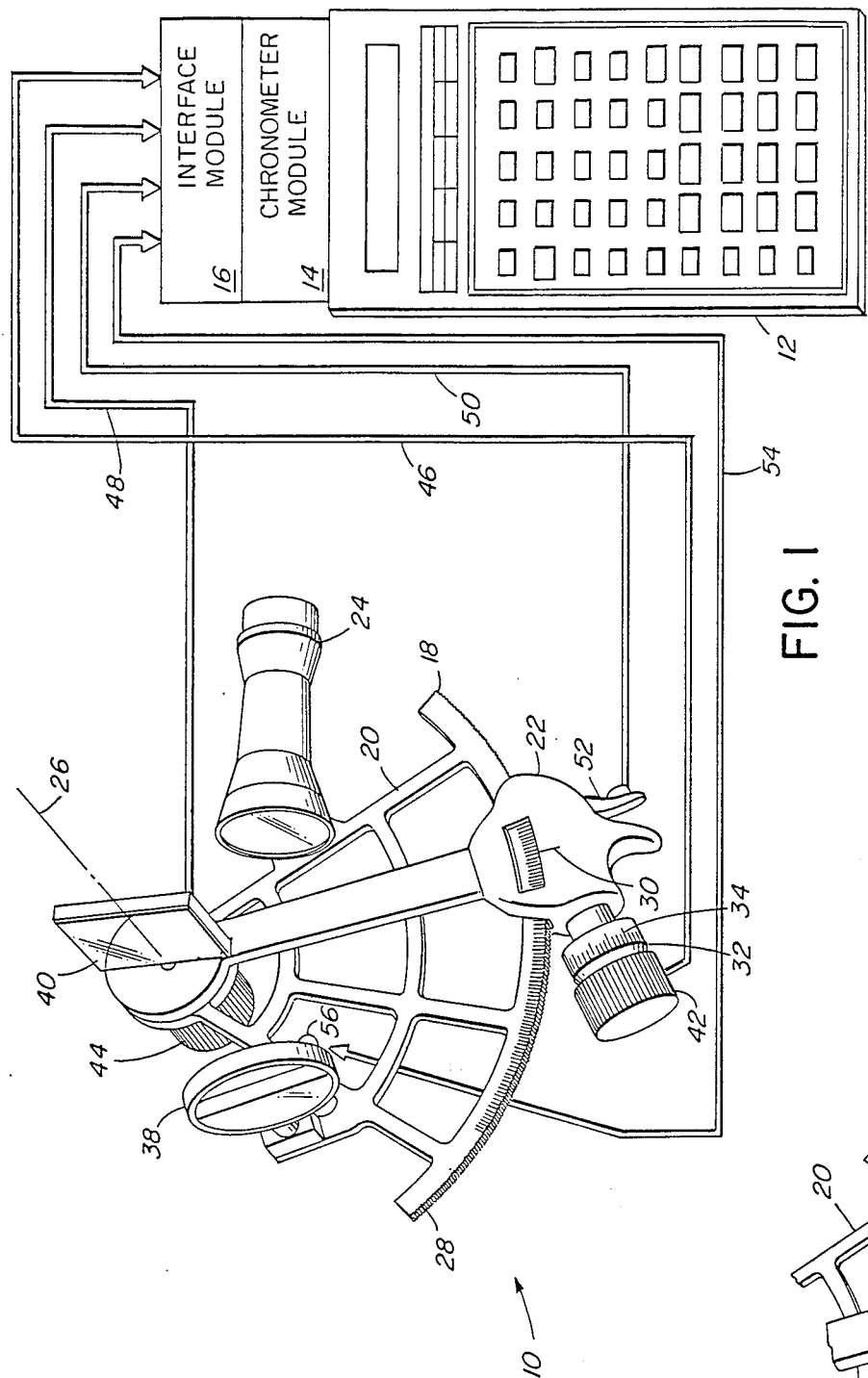
FIG. 1 is a diagram of a celestial navigation system including a perspective view of a sextant.

Referring to FIG. 1, celestial navigation system 10 has portable programmable calculator 12 (e.g., Hewlett-Packard HP41CX programmed with sight reduction algorithms and a nautical almanac, and including interface module 16 and internal chronometer module 14 for providing a digital Greenwich Mean Time) and sextant 18. Sextant 18 includes frame 20, tangent arm 22, and telescope 24. Tangent arm 22 is pivotally attached to frame 20 at one point to permit rotation of arm (member) 22 about arm axis 26. Frame (member) 20 has a portion formed as an arc 28 of a circle centered on arm axis 26 and a surface of arc 28 is precisely indexed with lines for visually indicating degrees of altitude above the horizon. Arm 22 has reference mark 30 for indicating a position along arc 28. The motion of arm 22 can also be controlled by micrometer screw 32 which bears index lines 34 around its circumference to indicate minutes and tenths of minutes with respect to a reference mark (not shown). Horizon glass 38 is located on the optical axis of telescope 24 and has a clear glass half (through which the horizon can be sighted using the telescope) and a mirrored half which can receive reflections from mirror 40 mounted an arm 22 along axis 26. Light from celestial objects is reflected first by mirror 40 and then by the mirrored half of glass 38 and can be viewed through telescope 24 simultaneously with the horizon. Rotation of arm 22 relative to axis 26 causes a shift in an observed star's apparent position with respect to the horizon.

Micrometer optical encoder 42 (e.g., model 561 available from Dynamics Research Corp.) is mounted on the shaft of micrometer screw 32 so that rotation of screw 32 causes rotation of the optical encoder shaft. Arc optical encoder 44 (e.9., the same model mentioned above or model HEDS-5000 available from Hewlett-Packard Co.) is mounted on frame 20 so that rotation of arm 22 causes rotation of the optical encoder shaft. Sextant 10 is connected by electrical lines through interface 16 to calculator 12. Lines 48, 46 carry signals from encoders 44, 42 respectively corresponding to degrees and to minutes and tenths of minutes. Line 50 connects observation trigger 52 on tangent arm 22 to interface module 16. Line 54 is connected to carry power from interface module 16 to on-star light 56, which is mounted in a position to be visible through telescope 34 simultaneously with the images provided by horizon glass 38.

Within optical encoders 42, 44 are optical tracks consisting of opaque patterns of equally spaced lines deposited on transparent substrates. Optical encoder 44 is used to read the coarse angular setting of tangent arm 32 to the nearest degree and is a small commercial incremental optical encoder having an encoder track with, e.g., 720 lines per revolution. A combination of a light-emitting diode/phototransistor pair and a grating are used with the encoder track to generate a succession of signals indicative of the angular position of tangent arm 22 as it is rotated about axis 26. Encoders 42, 44 also have direction sensing channels for providing signals corresponding to the direction of rotation.

Optical encoder 42 similarly is an inexpensive commercial incremental encoder used to read the fine angular setting of micrometer screw 32 and has, e.g., up to 600 lines per revolution on the encoder track to provide an accuracy of 0.17%.

Calculator 12 includes a program which counts the succession of signals and senses direction of rotation from encoders 42, 44, determines the corresponding angular readings for each encoder, and combines the two readings to yield an altitude angle accurate to arc minutes (or tenths of arc minutes if desired).

Operation

To use sextant 18 to generate an altitude value for a selected celestial body, e.g., a star, the navigator sights the horizon, moves the tangent arm around to the 0° altitude position, and squeezes trigger 52 to indicate to calculator 12 that tangent arm 22 is zeroed.

Figure 2:
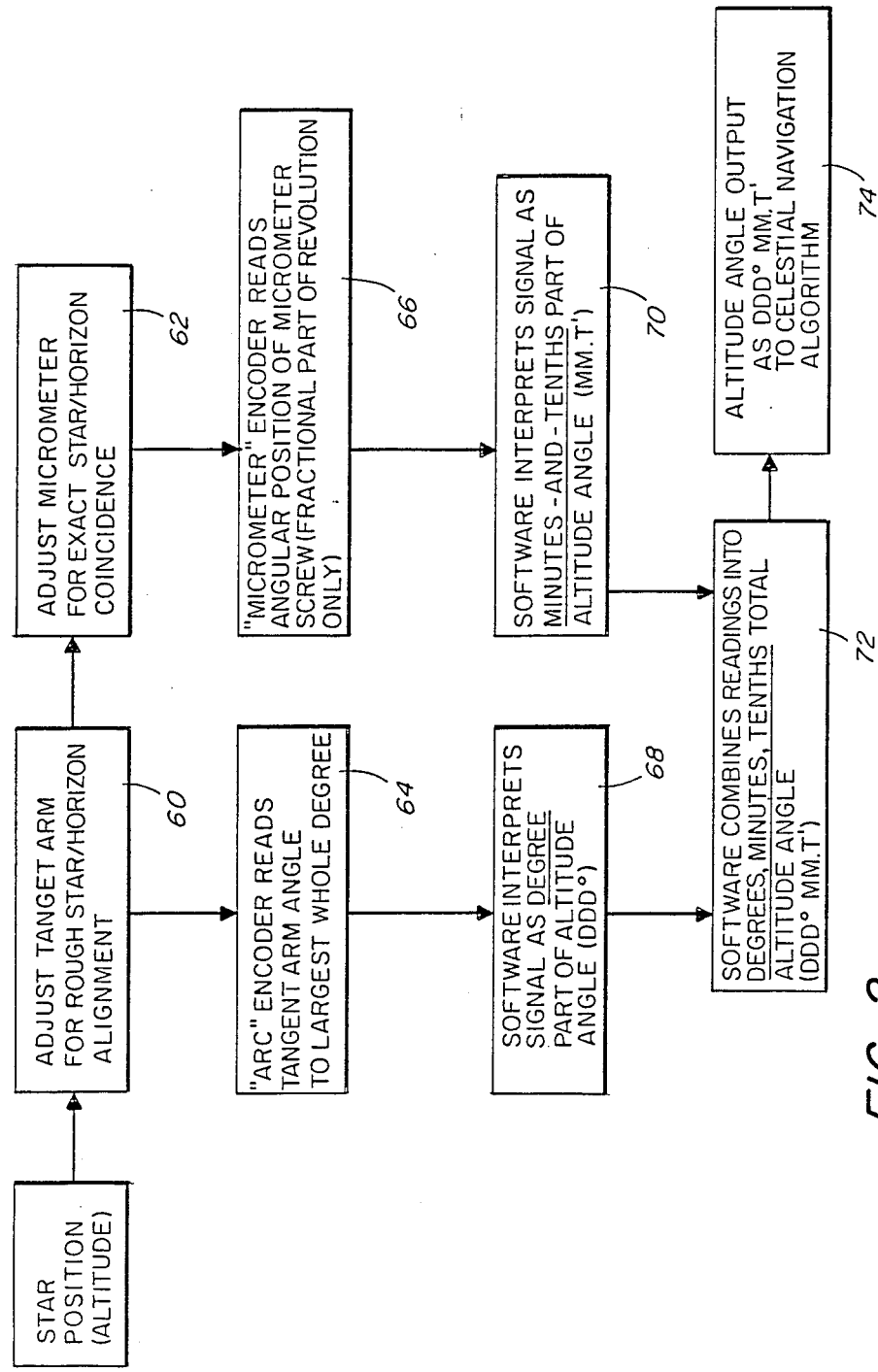
FIG. 2 is a flow chart for determining altitude.

Referring to FIG. 2, tangent arm 22 is then rotated (60) until the selected star is seen approximately at the horizon in the horizon glass. While tangent arm 22 is being rotated encoder 44 is issuing a succession of signal pulses (64) to calculator 12. Calculator 12 interprets (68) the pulses from encoder 44 as the degrees part of the altitude. Next, micrometer screw 32 is turned (62) to cause the selected star to be viewed precisely at the horizon in the horizon glass. While micrometer screw 32 is being turned, encoder 42 is issuing a succession of signal pulses to calculator 12 which are interpreted (70) as the minutes and tenths of minutes part of the altitude.

When the selected celestial body is seen precisely at the horizon, trigger 52 is again squeezed which causes calculator 12 to use the current altitude angle as the altitude of the selected body. The degrees, minutes and tenths of minutes are combined (72) into the altitude angle (74) of the selected star. The altitude angle can then be used with conventional celestial navigation algorithms to derive a line-of-position.

Figure 3A:
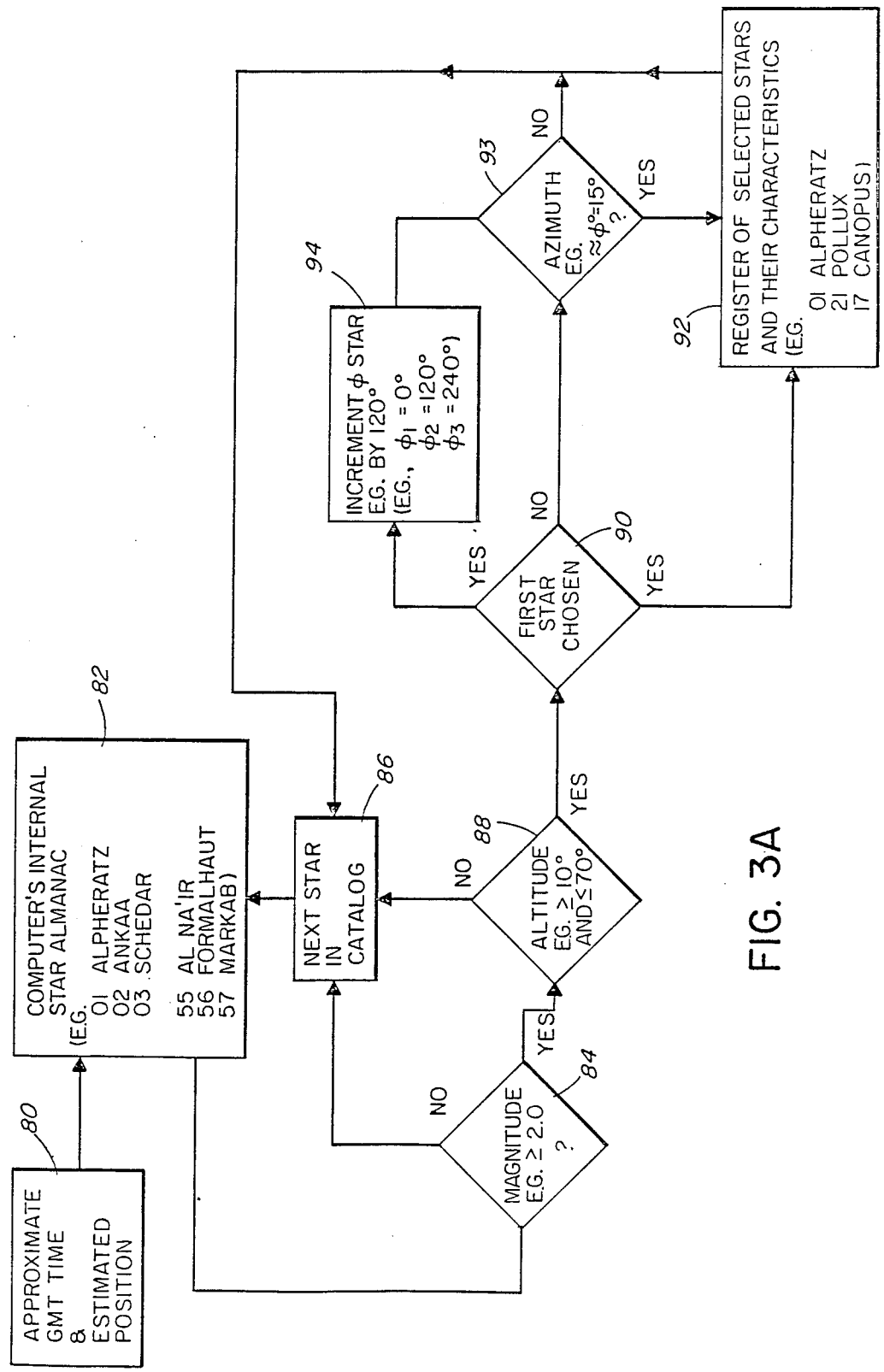
FIGS. 3A and 3B are flow charts for selecting a celestial body for observation and for obtaining a line of position.
Figure 3B:
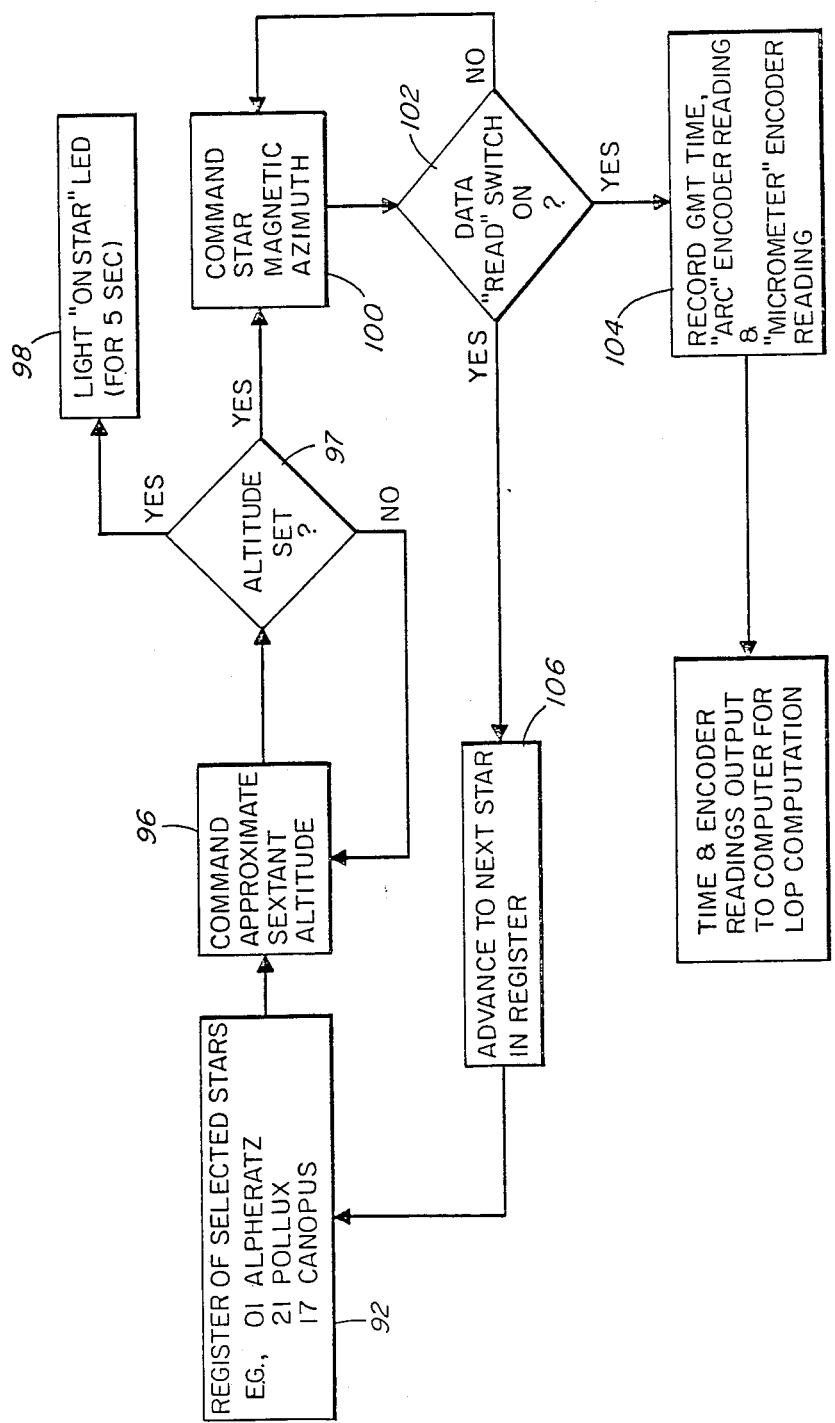

Referring to FIGS. 3A and 3B, calculator 12 is also programmed to select celestial bodies for observation based on the approximate position and time and date, to read the navigator's observed star altitudes from sextant 18, and to generate time and altitude readings for use in determining lines of position and in turn to fix the position. The dead reckoning position is first loaded (80) through the calculator's keyboard, and the Greenwich Mean Time and date are read automatically from chronometer module 14. Calculator 12 then searches the stored nautical almanac (82) for three suitable stars visible at that position and time. The stars in the almanac are considered in succession. If the star's magnitude is not at least 2.0 (84), the next star in the almanac is considered (86). If the first star's magnitude is at least 2.0 but its altitude is not between, e.g., 10% and 70% (88) (i.e., within a suitable range for observation), the next star is considered. If the first star has magnitude at least 2.0 and altitude between 10° and 70°, that star is chosen for observation and stored in a register (92) of selected stars. Otherwise, successive stars listed in the almanac are considered until one is found which satisfies both the magnitude and altitude requirements. If none is found, those requirements are relaxed and the star list is searched again. When a star is selected, if it is the first one to be selected (90) its identity and characteristics are entered into the register of selected stars (92) and a value ($\phi$) equal to the azimuth angle of that star plus 120° is stored (94). After being entered in the register, the system returns to the star almanac and searches for a second star for observation. This search is based not only on the magnitude and altitude ranges previously described but also on whether the azimuth of a given star is within, e.g., 15° of $\phi$ (93). This assures that the three stars selected for observation will be spaced across the sky at equal angular intervals of about 120°. Once three stars have been selected for observation, the system takes the first selected star and displays (96) its approximate expected altitude on the calculator, and conditions itself so that when the tangent arm is rotated to a position corresponding to that altitude (97), calculator 12 will send power to on-star light 56 which will then be illuminated (98) for 5 seconds indicating a proper setting. The calculator will next display (100) the azimuth (compass direction) at which the selected star is located. The navigator will aim the sextant in that direction, sight the star on the horizon by adjustment of the tangent arm and the micrometer screw and squeeze (102) trigger 52 to indicate that a reading should be taken. The Greenwich Mean Time, and degrees minutes and tenths of minutes will then be read and stored (104) and the calculator will advance (106) to the next star in the register of selected stars.

Based on the stored altitude reading for each selected star, calculator 12 uses stored conventional celestial navigation algorithms (e.g., those in the Hewlett-Packard "Nav-Pac" for the HP-41CX) to determine a line of position. Together the three lines of position are used to derive a position fix, using other conventional celestial-navigation algorithms (e.g., those listed in the HP-41 "Users' Library").

Multiple observations of the same star can be taken and averaged by the calculator to produce more accurate results.

Other embodiments are within the following claims. E.g., referring to FIG. 4, optical encoder 44 could be replaced by an optical encoder having an arc-shaped optical track 120 attached to arc 18 with a sensor 122 for reading the track attached to arm 22. In such embodiments, the micrometer encoder 42 could be omitted.

I claim:

1. In a sextant comprising an assembly having a frame and an arm interconnected at a pivot point to permit rotation of said arm relative to said frame around said pivot point to change the angular position of said arm relative to said frame,
   said arm being movable relative to said frame for coarse adjustment of angle,
   a fine adjustment mechanism connected to said assembly and having a movable element motion of which causes a predetermined corresponding amount of fine adjustment of said angular position of said arm, the improvement comprising
   a coarse adjustment encoder connected to said assembly and arranged to detect and provide signals corresponding to the coarse unit value of a final angular position of said arm relative to said frame, and
   a fine adjustment encoder connected to said assembly and arranged to detect and provide signals corresponding to the fine unit value of said final angular position, and
   means connected to said encoders for deriving from said coarse and fine unit values an indication of an altitude angle of a celestial body.
   said coarse adjustment encoder having a resolution by itself insufficient to produce an indication of said altitude angle useful in conventional navigation.

2. The sextant of claim 3 wherein motion of said movable element of said fine adjustment mechanism is mechanically synchronized with motion of said arm relative to said frame by a gear track on said frame.

3. The sextant of claim 3 wherein said fine adjustment encoder has a resolution by itself insufficient to produce an indication of said altitude angle useful in conventional navigation.

4. The sextant of claim 3 wherein said fine adjustment mechanism comprises a micrometer screw.

5. The sextant of claim 3 wherein said coarse adjustment encoder comprises a shaft angle encoder attached at said pivot point.

6. The sextant of claim 3 wherein said coarse adjustment encoder comprises an optical shaft angle encoder.

7. The sextant of claim 3 wherein said fine adjustment encoder comprises an optical shaft angle encoder.

8. The sextant of claim 7 wherein said optical shaft angle encoder comprises an optical track providing no more than 1000 lines per revolution of said arm.

9. The sextant of claim 8 wherein said optical shaft angle encoder comprises an optical track providing no more than 600 lines per revolution of said micrometer screw.

10. A sextant system for making altitude observations comprising
    a sextant,
    a memory for storing reference altitude signals for a plurality of celestial bodies,
    means connected to said sextant for providing angle signals corresponding to the angular setting of said sextant,
    an indicator for alerting the user that said angular setting corresponds to said reference altitude of a selected celestial body, and
    circuitry for comparing said angle signals and said reference altitude signals and for triggering said indicator.

11. The sextant system of claim 10 wherein said memory is further arranged for storing estimated current position signals and reference azimuth signals for said celestial bodies, and further comprising
    a clock for providing signals corresponding to the current time, and
    searching means responsive to said memory and said clock for identifying celestial bodies for observation at said estimated current position at said current time, and for retrieving said reference altitude signals and reference azimuth signals of said identified celestial bodies.

12. The sextant system of claim 11 further comprising
    means for triggering a reading of said angle signal corresponding to each said identified celestial body, and
    analysis circuitry arranged for deriving a line of position from said read angle signal.

* * * * *

UNITED STATES PATENT AND TRADEMARK OFFICE
CERTIFICATE OF CORRECTION

PATENT NO. : 4,763,418

DATED : August 16, 1988

INVENTOR(S) : John A. Decker, Jr.

Figure 4:
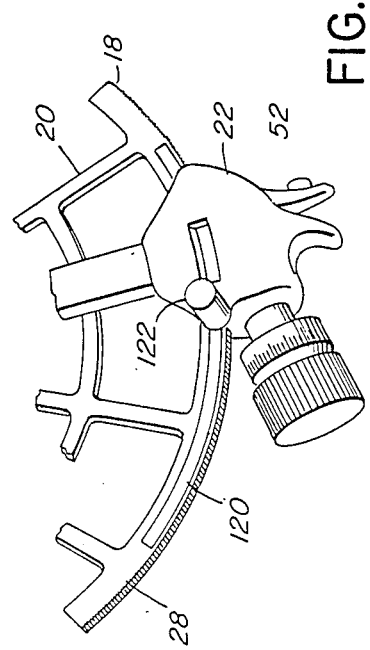
FIG. 4 shows a modification.

It is certified that error appears in the above-identified patent and that said Letters Patent is hereby corrected as shown below:

In the Specification:

Column 2, Line 39: should read --Figure 4 is a modification of the encoder system.--

In the Claims:

Column 5, Line 38: "Claim 3" should be --Claim 1--

Column 5, Line 42: "Claim 3" should be --Claim 1--

Column 5, Line 46: "Claim 3" should be --Claim 1--

Column 6, Line 1: "Claim 3" should be --Claim 1--

Column 6, Line 4: "Claim 3" should be --Claim 1--

Column 6, Line 6: "Claim 3" should be --Claim 1--

Column 6, Line 8: "Claim 7" should be --Claim 5--

United States Patent and Trademark Office
CERTIFICATE OF CORRECTION

PATENT NO. : 4,763,418
DATED : August 16, 1988
INVENTOR(S) : John A. Decker, Jr.

It is certified that error appears in the above-identified patent and that said Letters Patent is hereby corrected as shown below:

Column 6, Line 11:     "Claim 8" should be --Claim 6--.

Signed and Sealed this

Twelfth Day of September, 1989

Attest:

DONALD J. QUIGG

Attesting Officer         Commissioner of Patents and Trademarks

Disclaimer 4,763,418.—*John A. Decker Jr.*, Wailuku, Hi. AUTOMATIC SEXTANT. Patent dated Aug. 16, 1988. Disclaimer filed Aug. 3, 1989, by the assignee, Kuau Technology, Ltd.

The term of this patent subsequent to Nov. 24, 2004, has been disclaimed.
[*Official Gazette October 31, 1989*]